Figure 1:
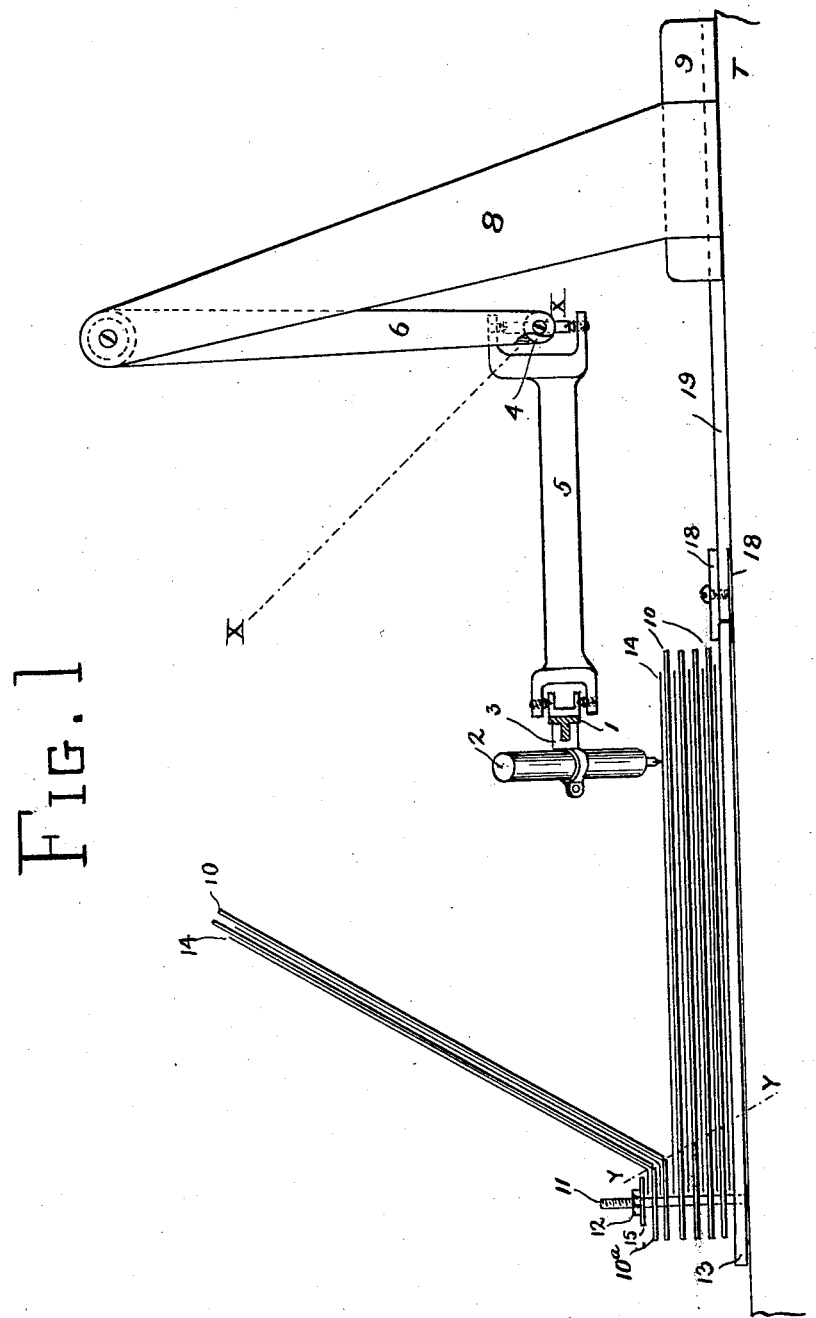

W. H. REMICK.
DOCUMENT BINDER FOR MULTIPLE WRITING MACHINES.
APPLICATION FILED JULY 19, 1912.

1,082,554.

Patented Dec. 30, 1913.
5 SHEETS—SHEET 3.

Witnesses,
T. O. MacKinnon
Seth Johnson

Inventor,
Wm. H. Remick
By F. Amos Johnson
Atty

W. H. REMICK.
DOCUMENT BINDER FOR MULTIPLE WRITING MACHINES.
APPLICATION FILED JULY 19, 1912.
1,082,554.
Patented Dec. 30, 1913.
5 SHEETS—SHEET 4.
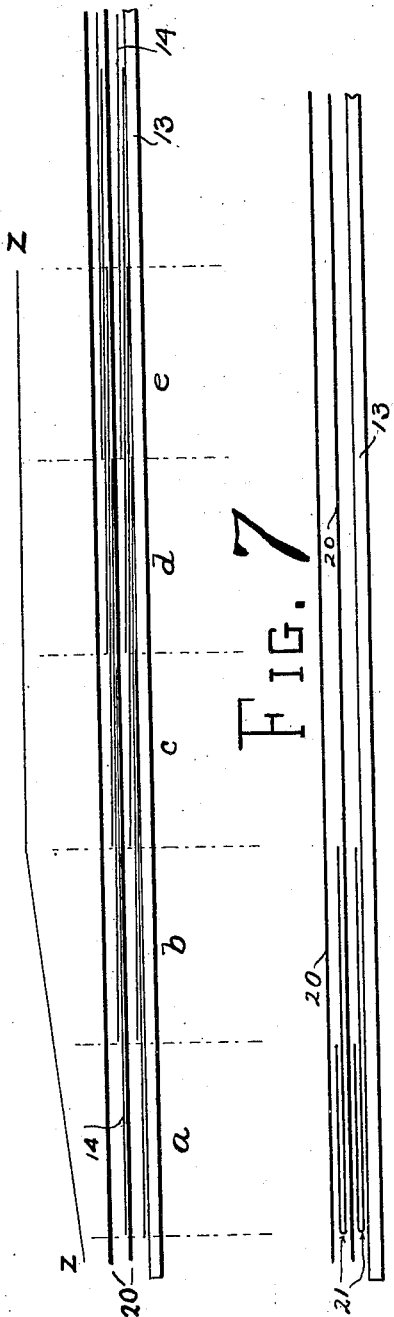
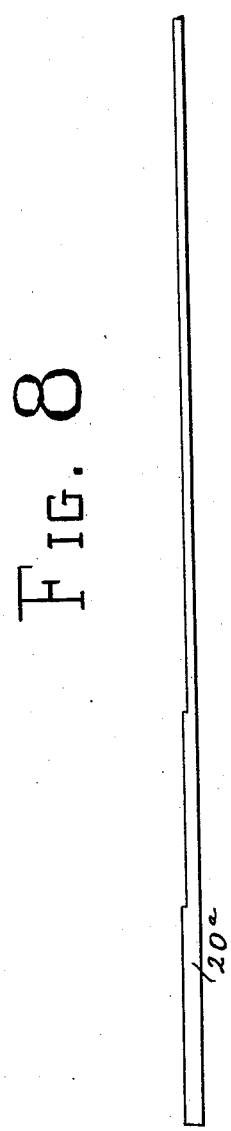
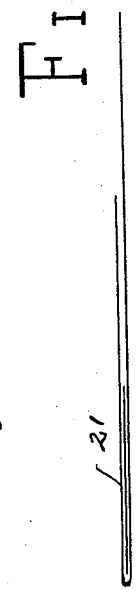
Witnesses
T. O. Mackinnon
Seth Johnson
Inventor
Wm. H. Remick
By F. Amos Johnson
Atty

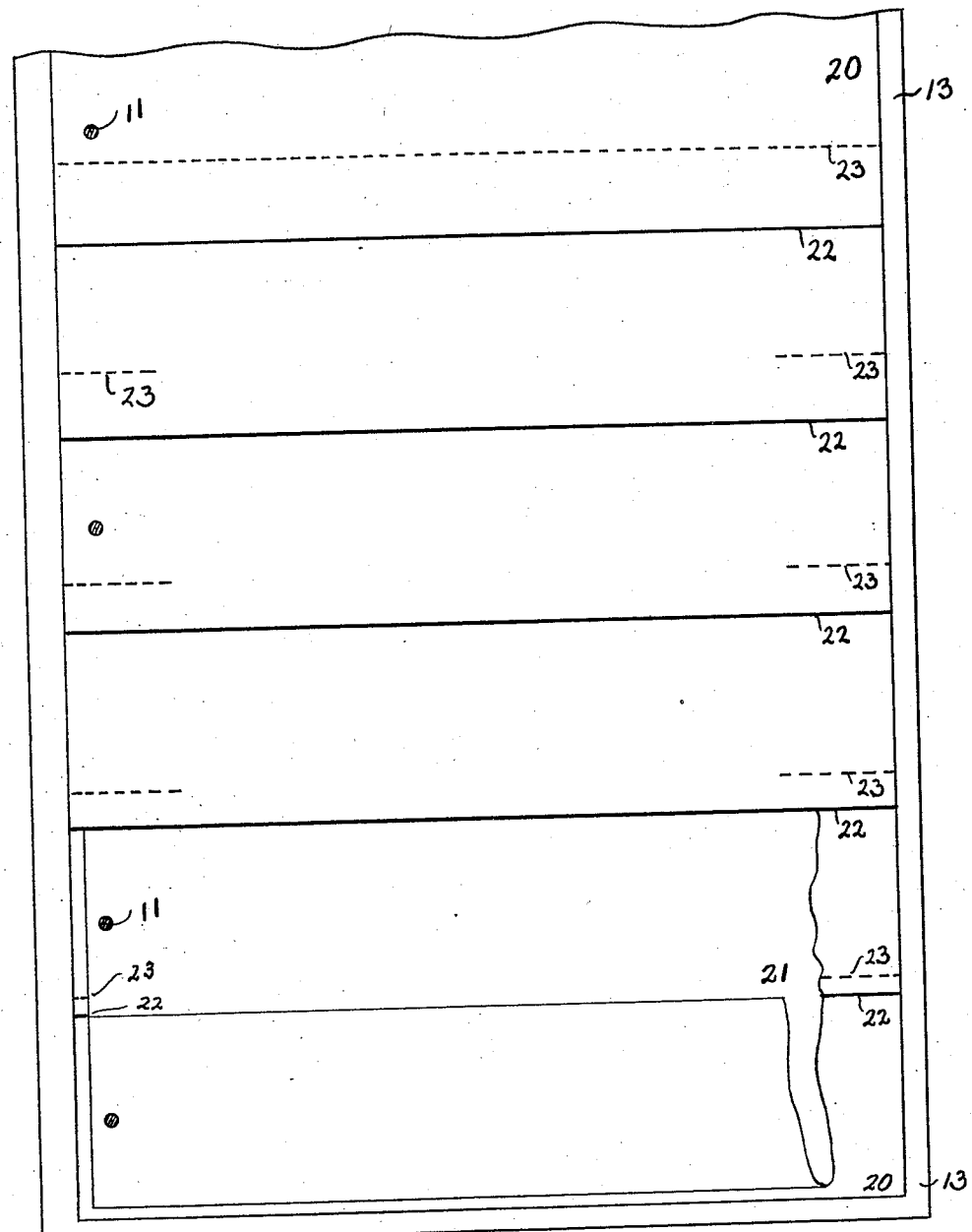

UNITED STATES PATENT OFFICE.

WILLIAM H. REMICK, OF NEW YORK, N. Y., ASSIGNOR TO SIGNATURE COMPANY, OF NEW YORK, N. Y., A CORPORATION OF NEW YORK.

DOCUMENT-BINDER FOR MULTIPLE-WRITING MACHINES.

1,082,554.

Specification of Letters Patent. Patented Dec. 30, 1913.

Application filed July 19, 1912. Serial No. 710,438.

*To all whom it may concern:*

Be it known that I, WILLIAM H. REMICK, a citizen of the United States, and a resident of New York, in the county of New York and State of New York, have invented a new and useful Document-Binder for Multiple-Writing Machines, of which the following is a specification.

My invention relates to means for temporarily binding or holding documents, such as bonds and stock certificates, while signatures are being affixed on a machine for simultaneously writing a plurality of signatures.

It is designed especially for use in connection with that class of machines referred to which are intended for desk use, in which the pens are mounted on a common pen-bar which has a universal movement in a horizontal plane, but which can be raised bodily from the writing surface.

In the commercial machine known as the Signagraph, which has been in use for a number of years, the pens are held in a horizontal plane above the writing platen and the documents which are to be signed are brought into writing position by a suitable conveyer and, after being signed, they are removed by the same conveyer. In the case of checks it is customary to print five on one sheet, so that the papers may be easily handled; but in the case of bonds and stock certificates which are very much larger, this method is not practicable. The documents are, therefore, set up or clamped in a suitable binder with the edges overlapping, the signature space being exposed at the bottom of the sheet, as many sheets being clamped in one binder as there are pens in a series on the writing machine. The documents are then handled the same as single sheets. Such a machine and method of handling documents is shown in U. S. Patent 880,950 to Woodward. The form of binder shown therein, while perfectly satisfactory for that type of machine, is not suitable for the desk variety of writing machines. Too much time is lost in removing one set of documents and substituting another set. The binders being thicker than the documents it is very difficult or impossible to stack one set on top of another, as can be done with single check sheets and, moreover, when so stacked the pile is thinner at the bottom where only one sheet of each of the overlapping documents extends beyond the others of the set and a curved or wedge-shaped writing surface is presented to the pens. If the pens were adjusted to write on top of the pile they would need re-adjustment every time a set of papers was removed after signing. My improvement allows a large number of these sets of overlapping documents to be piled one on top of another; provides a uniform flat or substantially flat writing surface and the top set may be removed as soon as signed to expose the next succeeding set below it. I accomplish this result by providing a plurality of writing platens and superimposing them one on top of another. These platens are clamped at one edge with sets of overlapping documents between—the platens themselves serving as binders for the documents. As soon as the top set of documents is signed the pens are moved out of the way and the writing platen which is under this set is raised by its outer or free edge to expose the second set; and so on down through the succeeding sets.

Preferred and alternative forms of construction for carrying out my invention are described in this specification and illustrated in the accompanying drawings, to which reference is made.

Figure 2:
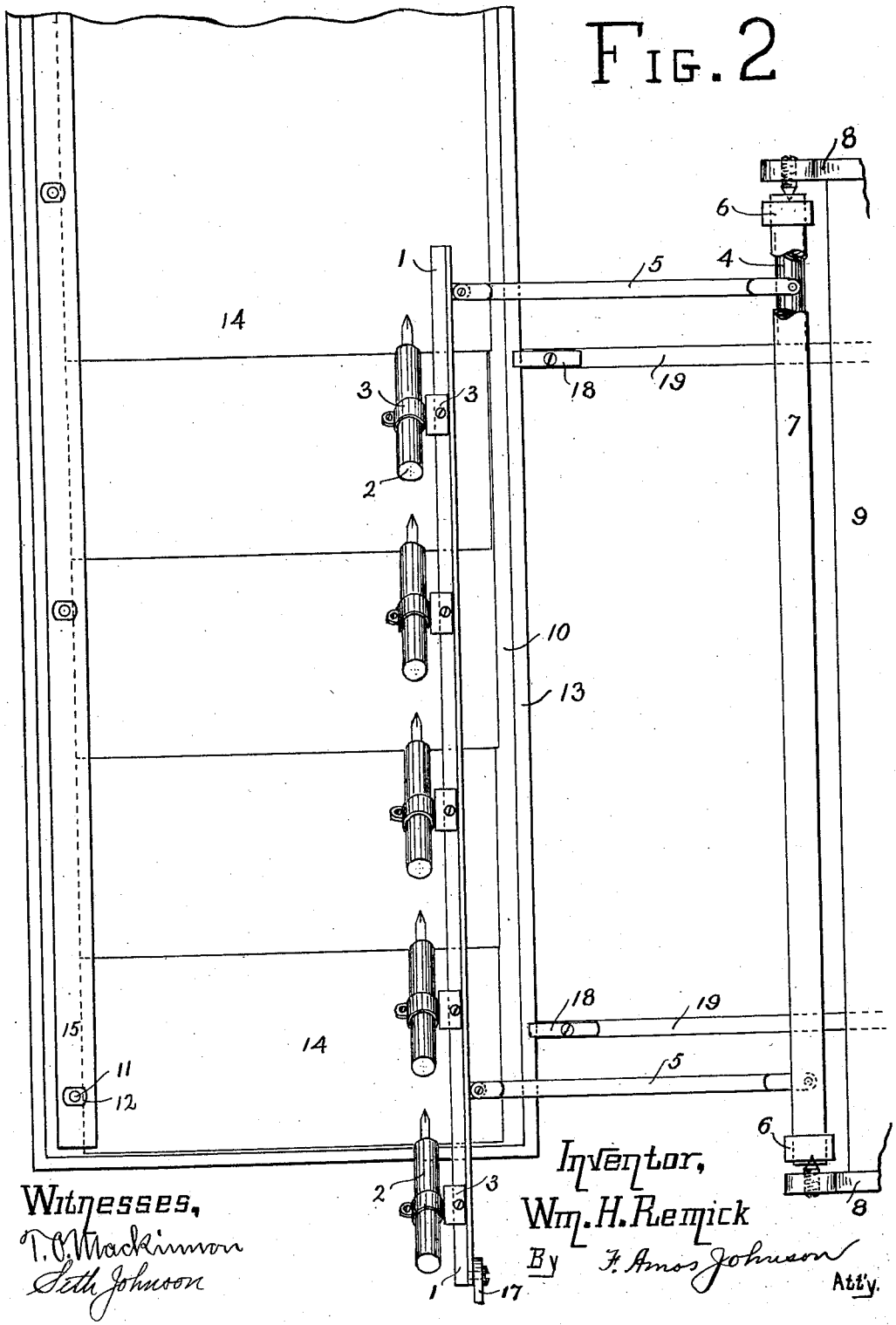
Figure 3:
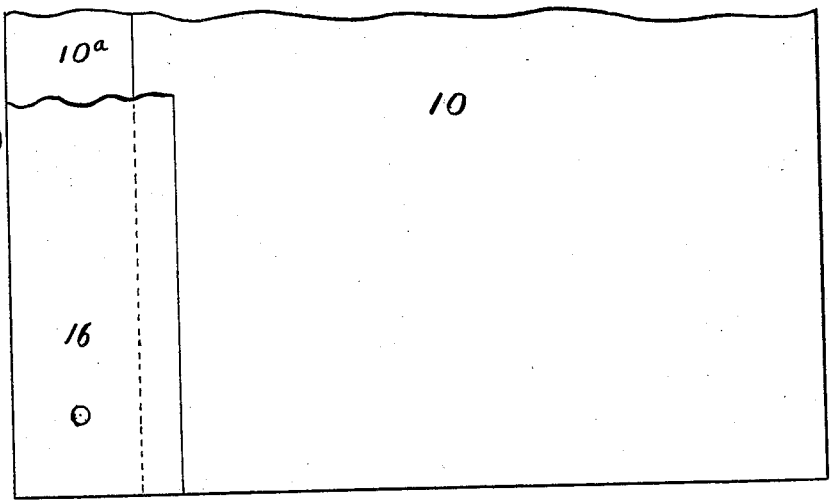
Figure 4:
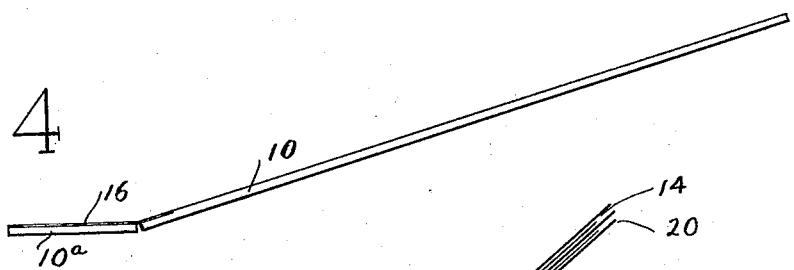
Figure 5:
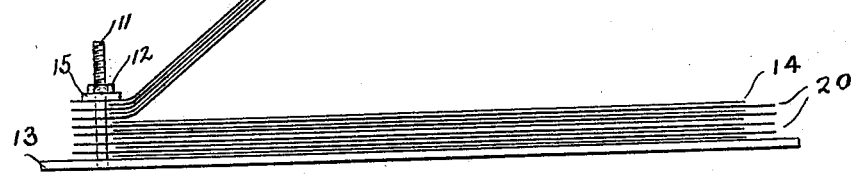

Figure 1 is a front elevation and Fig. 2 is a plan of one form of my binder and a multiple writing machine of the desk variety; Fig. 3 is a plan and Fig. 4 an end elevation of one of the platens, showing the hinge construction; Fig. 5 is an end elevation of an improved form of document binder; Figs. 6, 7 and 8 are side elevations of the platens, documents and blocking pieces; Fig. 9 is an end elevation of one of the blocking pieces; and Fig. 10 is a plan of a platen and blocking piece showing gage marks on the platen.

Referring to Figs. 1 and 2, in which I have shown one form of my binder and a sufficient portion of a machine for writing simultaneously a plurality of signatures as is necessary to illustrate its use therewith, the writing machine comprises a pen-carrying frame which is in the form of a pivoted parallelogram, one side 1 constituting the pen-bar, to which the pens 2 are attached by clamps 3. The opposite side of the frame is a rock-shaft 4, to which the pen-bar is pivotally connected by links 5. The rock-shaft is axially pivoted between the extremities of a pair of arms 6 which are rigidly secured to a second rock-shaft 7. This second rock-shaft is axially pivoted between the upper ends of a pair of brackets 8, which are secured to a bed plate 9—the whole resting on a table T.

The document binder comprises a plurality of platens 10 which are secured or clamped along their left hand edges by posts 11 and nuts 12 to a suitable platen support 13. The left edges of the documents 14 which are to be signed are clamped between the platens—a strip 15 clamping the documents on the uppermost platen. In Fig. 1 the platens and documents are shown as opened up or separated on the posts 11. The platens are made in two portions 10 and 10ᵃ which are hinged together by a strip of flexible material 16. These platens may be made of any suitable material such as cardboard and in this case the hinge portion may be made of cloth. Light aluminum sheets or other metal may be used and flexible metal hinges. The portions 10ᵃ of the platens serve to grip or bind the documents 14 and the outer parts 10 may be swung upward as shown in Fig. 1 to remove the set of documents which has been signed and to expose the next set for signing—the pen frame being swung outward to position indicated by the line X—X. The pilot or usual guide handle for the pen-bar (not shown) is secured by an arm 17 to the front end of the pen-bar.

The platen support 13 for the platens 10 is secured by clips 18, which are on the ends of bars 19 which are secured to the bed plate of the writing machine. This holds the documents in writing position and prevents them from being moved as the platens are raised one after another by the signature writer or his attendant.

As many documents are set up in each set as there are pens in the pen-bar. In order to economize space the sheets are made to overlap, as already stated, so that only the portion of the documents which are to receive the signatures are exposed at the bottom. This makes an uneven writing surface, as will be evident on inspecting Fig. 6. In the space a there is but one sheet on the platen; in the space b there are two; in the spaces c, d and e there are three each. When writing on stiff platens, such as those just described, the pens may be adjusted to compensate for this unevenness or variation in thickness; but the use of thick platens, which is necessary to get the required stiffness, makes the binder build up too bulky and the hinge portions 10ᵃ have to be made of gradually increasing length—following the line Y—Y in Fig. 1, in order to allow the platens and documents to be raised out of the way after signing and it also makes it difficult to sign close to the left hand margin of the documents. I, therefore, prefer to use flexible platens 20, such as paper or cloth, where there are any considerable number of documents to be set up for signing at one time. These are held in precisely the same way as the thick platens, but they do not require any hinge, as the platens themselves bend and may be raised as shown in Fig. 5 where they are illustrated with sets of documents between, slightly separated on the posts 11.

It will be evident on again inspecting Fig. 6 that if a plurality of sets of overlapping documents are assembled between flexible platens that the pile will assume or tend to the form of the line Z—Z—being wedge-shaped at the front end and horizontal over the portions c, d and e. To compensate for this I secure blocking pieces 21 between the platens. This makes each set of documents and its platen of substantially the same thickness throughout the writing portion of the platen. These blocking pieces may be glued to the platens which would form a stepped platen, as shown in Fig. 8; but I prefer to fasten them as shown in Figs. 7 and 10—using folded strips and securing them on the posts 11 in the same way as the platens are secured, which gives the same effect as a stepped platen and they may be changed to accommodate different width documents and different spacing of the pens on the pen-bar. Fig. 7 shows a case where but two divisions have to be provided for. With such blocking pieces added to the documents shown in Fig. 6, it is evident that there would be three thicknesses in each division and that the documents and platens would pile up evenly giving a substantially flat writing surface at all times. Fig. 9 shows a case where the compensation has to be made in three divisions.

To facilitate the setting up of the documents in or between the binding platens, so as to give them a uniform overlap or so as to make one set correspond to another, I provide gage markings 22 on the platens, as shown in Fig. 10. These marks are preferably placed on both the upper and under sides of the platens. In case a greater lap is needed for the documents I provide additional sets of gage marks, one set 23 being shown. These marks have distinguishing characteristics, the set 22 being a heavy ruled line and the set 23 a dotted line. They may be further distingushed by a difference in color. These marks may extend quite across the platens or be placed only at the edges as may be desired or as is easiest to put them on.

It is evident that my improved binder is of great advantage for use in connection with the desk variety of multiple writing machines, in that it permits a large number of documents to be set up at one time in the smallest possible space; that they may be conveniently handled and stored away in a safe for security either before or after signing; that a good even writing surface is provided and that the arrangement is easily manipulated.

Having now described my invention, what I claim is:

1. A plurality of writing platens superimposed one on top of another; means for binding said platens at one edge—said binding means being adapted to clamp between each two adjacent platens a series of overlapping documents; in combination with means adapted to render each series of overlapping documents and its writing platen uniform in thickness over the writing surface.

2. A plurality of writing platens superimposed one on top of another; means for binding said platens at one edge—said binding means being adapted to clamp between each two adjacent platens a series of overlapping documents; in combination with means for indicating the position of said overlapping documents to secure uniform spacing of one set with another.

3. A plurality of writing platens superimposed one on top of another; means for binding said platens at one edge—said binding means being adapted to clamp between each two adjacent platens a series of overlapping documents; in combination with marks on said platens to indicate the position of said overlapping documents to secure uniform spacing of one set with another.

4. A plurality of writing platens superimposed one on top of another; means for binding said platens at one edge—said binding means being adapted to clamp between each two adjacent platens a series of overlapping documents; in combination with means for indicating the position of said overlapping documents to secure uniform spacing of one set with another and compensating blocking pieces secured between said platens to secure uniform thickness of each series of documents and its platen over the writing surface.

5. A plurality of writing platens superimposed one on top of another; a platen support to which said platens are secured; binding means adapted to bind one edge of said platens to said platen support and to clamp between each two adjacent platens a series of overlapping documents; in combination with means for indicating the position of said overlapping documents on said platens to secure uniform spacing of one set with another and blocking pieces secured between said platens to compensate for the uneven thickness of each set of overlapping documents over the writing surface.

6. A plurality of writing platens superimposed one on top of another; means for binding said platens at one edge—said binding means being adapted to clamp between each two adjacent platens a series of overlapping documents; in combination with a plurality of sets of gage marks on said platens to indicate the position of said overlapping documents to secure uniform spacing of one set with another—said sets of marks being formed with distinguishing characteristics one set with another.

In testimony whereof I affix my signature in presence of two witnesses.

WILLIAM H. REMICK.

Witnesses:
 CHARLES C. TOWNSEND,
 HENRY M. GRAHAM.

Copies of this patent may be obtained for five cents each, by addressing the "Commissioner of Patents, Washington, D. C."